May 19, 1936.  C. L. HALL  2,041,336
FASTENER SECURED INSTALLATION AND FASTENER MEMBER THEREFOR
Filed March 15, 1933
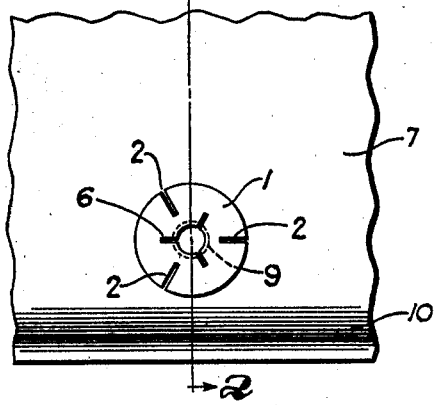
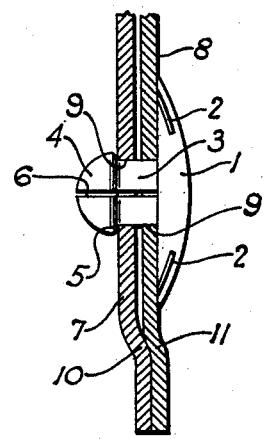
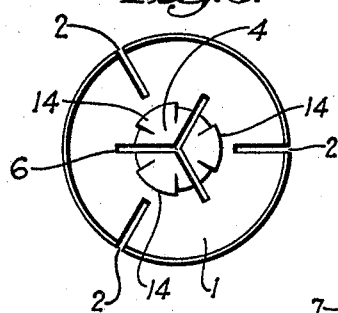
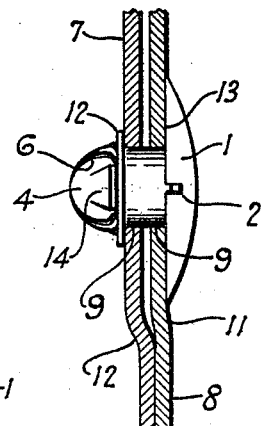
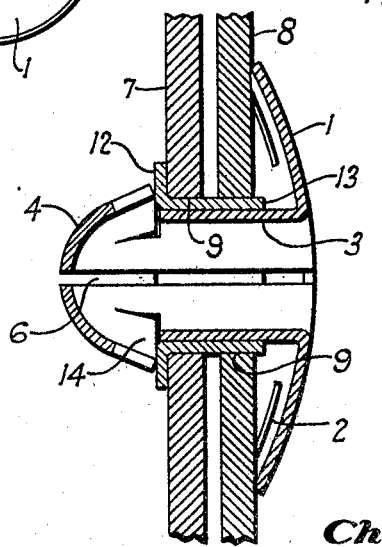
Inventor:
Charles L. Hall
by Walter S. Jones
Atty.

Patented May 19, 1936

2,041,336

UNITED STATES PATENT OFFICE 2,041,336

FASTENER SECURED INSTALLATION AND FASTENER MEMBER THEREFOR

Charles L. Hall, Detroit, Mich., assignor to United-Carr Fastener Corporation, Cambridge, Mass., a corporation of Massachusetts Application March 15, 1933, Serial No. 660,875

2 Claims. (Cl. 287—101)

My invention aims to provide improvements in fastener secured installations and fastener members therefor.

In the drawing which illustrates preferred embodiments of my invention:—

Figure 1 is a plan view of a portion of an installation embodying my invention;

Fig. 2 is an enlarged section taken on the line 2—2 of Figure 1, the fastener member being shown in elevation;

Fig. 3 is an end view of a modified form of fastener member;

Fig. 4 is a section of a structure showing the parts illustrated by Fig. 2 but with the addition of a bushing and the modified form of fastener shown in Fig. 3; and Fig. 5 is an enlarged complete section of the parts shown in Figure 4.

In the particular embodiment of my invention selected for illustration by the drawing, the snap fastener or hinge pin is formed from a single piece of sheet metal and has a concavo-convex base 1 divided by radial slits 2 extending from the edge toward the center to permit yielding of the base. The hinge pin fastener illustrated also has a tubular shank pressed from the metal of the base and shaped to provide a neck portion 3, a head 4 and a shoulder 5. The shank is divided longitudinally by slits 6 to permit yielding action thereof.

In the particular installation selected for illustration of my invention (Figs. 1 and 2) I have provided two relatively thin sheet metal parts 7 and 8 each of which is provided with an aperture 9—9 in alignment with each other. The plate-like members 7 and 8 are adapted to be rotated relative to each other and are provided with camming surfaces 10 and 11. When the plates are rotated the surfaces 10 and 11 cause the plates 7 and 8 to move away from each other. During this operation the shoulder 5 of the fastener member holds tight and the base tends to flatten thereby maintaining a tension on the two plate members.

Referring now to the particular embodiment of my invention illustrated by Figs. 3, 4 and 5, I have shown, in combination with the fastener member and the plate members, a bushing having a flange 12 bearing against one face of the plate member 7 and a tubular portion 13 passing through the apertures 9—9 in both of the plates, as best illustrated in Figs. 4 and 5. In the installation illustrated by Figs. 4 and 5 the neck portion 3 of the stud member passes through the tubular portion 13 of the bushing and the angled projections 14, pressed from the sides of the head 4, have their free ends terminating in engagement with the flange 12 of the bushing, as best illustrated in Fig. 5. Thus when the plate members 7 and 8 are rotated relative to each other the projections 14 hold the bushing against rotation relative to the fastener member so that the wear will come on the bushing rather than on the fastener.

Both of the constructions illustrated are practical and the more expensive construction illustrated by Figs. 3, 4 and 5 is only necessary when there is to be considerable relative rotation of the sheet metal parts 7 and 8 over a relatively long period of time. Both constructions are simple, easy to manufacture and relatively inexpensive.

This fastener is particularly though not exclusively useful to secure together and constitute the hinge pin for elements such as a pair of scissors blades. In this connection, when it is desired to remove the fastener, say, to facilitate sharpening of the blades or to enable replacement of the worn element (in Figs. 4 and 5, the bushing 9—12) this may be effected by squeezing the head portions 5 together to flex the shank portions, and by concurrently inwardly flexing the angled projections 14 in the embodiment of Figs. 4 and 5, so that the fastener can be withdrawn. Pressing inwardly on the base 1 to project the head portions 4 outwardly, serves to render the head more accessible, which is of particular utility in the embodiment of Figs. 4 and 5 in which it facilitates compression of the projections 14 to a position enabling removal.

While I have illustrated and described preferred embodiments of my invention, I do not wish to be limited thereby, because the scope of my invention is best defined by the following claims.

I claim:

1. A snap fastener for securing a pair of juxtaposed apertured members having the apertures in alignment, comprising a bushing having a flange bearing against one member and a tubular shank extending into the apertures, a snap fastener member having a yieldable shank extending through the tubular shank, a yieldable base on one end of said shank contacting with one of said members, and a shouldered head on the other end of said shank having in addition to said head a plurality of angled projections having free edges spaced laterally from said head and engaging with the flange of said bushing to hold said members together, and said yieldable base permitting relative movement of said apertured members toward and away from each other.

2. A snap fastener member formed from a single piece of metal and having a base dished in cross-section and divided by cuts extending inwardly from the periphery thereof to permit flattening of said base, a tubular shank extending from said base and having an enlarged head adjacent to the free end thereof and said head being divided by cuts other than those provided for flexing of the base thereby to permit contraction and expansion of said head.

3. A snap fastener member formed from a single piece of metal and having a materially yieldable base dished in cross-section, a shank extending from said base and having a head adjacent to the free end thereof and said head having in addition thereto a plurality of projections having free edges spaced laterally from said head and facing toward said base.

CHARLES L. HALL.